United States Patent [19]

Bergmann et al.

[11] Patent Number: 4,981,261
[45] Date of Patent: Jan. 1, 1991

[54] SHUT-OFF VALVE FOR SCALD PREVENTION

[75] Inventors: Konrad Bergmann; Josef Ems, both of Wittlich; Hans Nikolayczik, Minheim, all of Fed. Rep. of Germany

[73] Assignee: American Standard Inc., New York, N.Y.

[21] Appl. No.: 253,859

[22] Filed: Oct. 4, 1988

[30] Foreign Application Priority Data

Oct. 8, 1987 [AT] Austria .................... 62-2661

[51] Int. Cl.$^5$ .................................. G05D 23/08
[52] U.S. Cl. ............................... 236/93 B; 251/45
[58] Field of Search ............... 236/93 R, 93 B, 80 F, 236/12, 11; 251/30.03, 45, 46

[56] References Cited

U.S. PATENT DOCUMENTS

| 2,449,766 | 9/1948 | Brown | 236/12.11 |
|---|---|---|---|
| 2,542,273 | 2/1951 | Brown | 236/12.11 |
| 2,550,907 | 5/1951 | Brown | 236/12.11 |
| 2,708,071 | 5/1955 | Burhop | 236/12 |
| 3,028,094 | 4/1962 | Burhop | 236/12 |
| 3,110,469 | 11/1963 | Becker | 251/45 |
| 3,388,861 | 6/1968 | Harding | 236/12 |
| 3,393,706 | 7/1968 | Burhop | 137/637.2 |
| 3,439,895 | 4/1969 | Marandi | 251/45 X |
| 3,561,483 | 2/1971 | Taplin | 236/12.11 X |
| 3,584,784 | 6/1971 | Burhop et al. | 236/12 |
| 4,121,761 | 10/1978 | Nolden | 236/12 R |
| 4,239,152 | 12/1980 | Kitamura et al. | 236/48 R |
| 4,239,154 | 12/1980 | Inada et al. | 236/87 |
| 4,480,784 | 11/1984 | Bennett | 236/93 B |
| 4,505,450 | 3/1985 | Saarem et al. | 251/46 X |
| 4,508,314 | 4/1985 | Hemme | 251/11 |

FOREIGN PATENT DOCUMENTS

| 2460219 | 12/1974 | Fed. Rep. of Germany . |
| 3118904A1 | 5/1981 | Fed. Rep. of Germany . |
| 1299652 | 4/1970 | United Kingdom . |
| 2175673A | 12/1986 | United Kingdom . |

Primary Examiner—William E. Tapolcai
Attorney, Agent, or Firm—John P. Sinnott

[57] ABSTRACT

An assembly is provided for the prevention of scalding in showers and other such installations. The assembly includes a valve assembly within a mixed water supply line and a temperature sensitive element for controlling the operation of the valve assembly. The valve assembly is preferably designed to allow some leakage when in the closed position.

2 Claims, 5 Drawing Sheets

SHUT-OFF VALVE FOR SCALD PREVENTION

BACKGROUND OF THE INVENTION

The invention relates to scalding prevention means for sanitary installations, in particular showers.

It frequently happens that, owing to irregularities in water pressure and/or heating, the temperature of mixed water as adjusted within a sanitary installation will vary, and that scalding may result if the cold water supply is insufficient or fails altogether.

This occurs in many instances when a large volume of cold water is used in one location in a building while a person is attempting to use a mixture of hot and cold water in another location thereof. Since a temperature change in a mixture of hot and cold water can be quite sudden and unexpected when the cold water supply thereto becomes insufficient, scalding can easily occur.

SUMMARY OF THE INVENTION

A principal object of the invention is to provide scalding prevention means for a mixed hot/cold water supply such as a shower.

In accordance with this object of the invention, a valve is provided in a mixed water supply line to a tap. A temperature-sensitive element is provided for controlling the operation of the valve. When the temperature of the water exceeds a preselected level, the valve closes and the water supply is substantially shut off. Preferably some water passes through the valve to indicate that the fixture has not been permanently shut off.

DETAILED DESCRIPTION OF THE INVENTION

Figure 1:
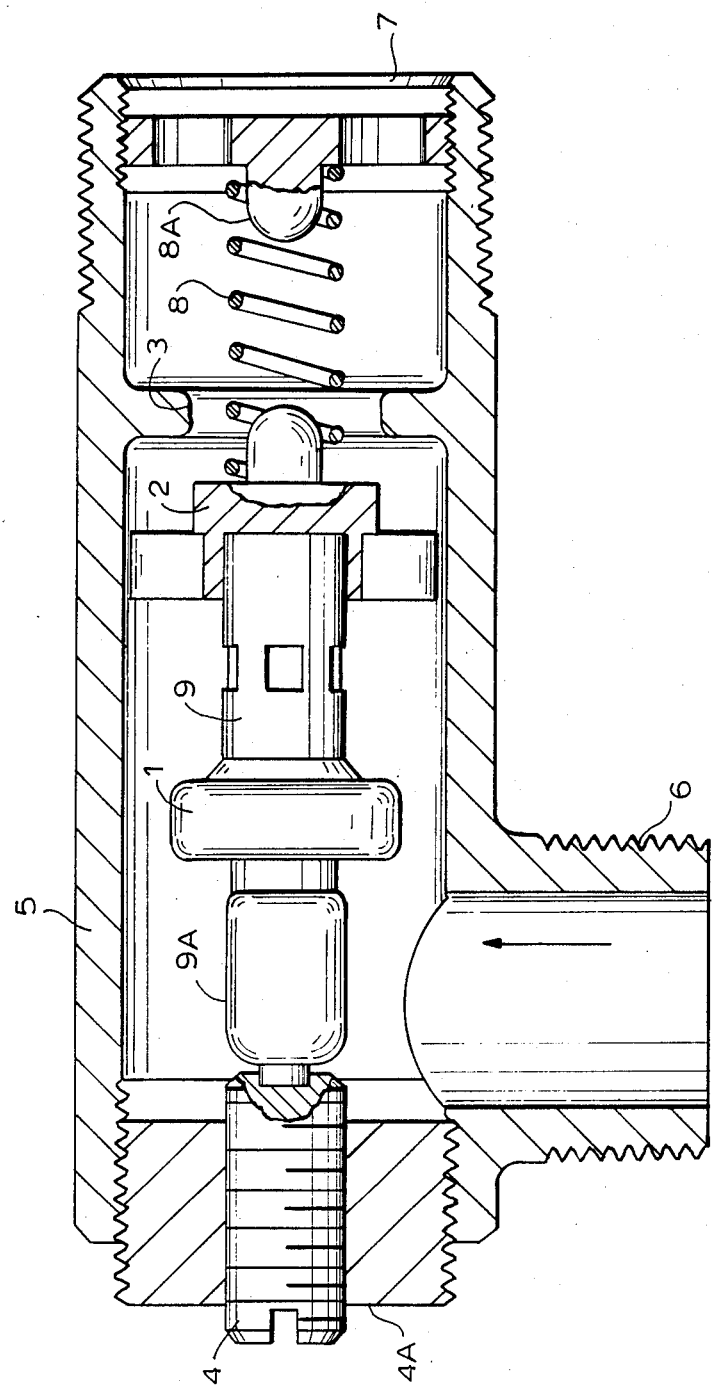
FIG. 1 is a sectional of a first embodiment of the invention including a disk valve.

An assembly is provided for cutting off the water supply to a tap when the temperature exceeds a preselected level. Referring to the drawings herein, similar numerals are used throughout to indicate similar, but not necessarily identical structures, in the various embodiments of the invention shown in the figures.

Referring to FIG. 1, a water supply line to a shower head or the like is shown. The supply line comprises a housing 5 including an inlet 6 for receiving a mixture of hot and cold water, and an outlet 7. A valve disk 2 operates in conjunction with a valve seat 3 to control the flow of water between the inlet and the outlet The valve disk 2 is mounted to a supporting member 9 which is, in turn, mounted to the rear end of the housing 5 by a set screw 4. The set screw is positioned in a threaded opening within a closure plug 4A. The set screw bears against a connecting member 9A and is rotatable with respect thereto. An expandable element such as a longitudinally expanding wax-filled thermostatic element 1 or the like is mounted to and positioned between members 9 and 9A.

A coil spring 8 is supported by the disk 2 at one end thereof and an abutment member 8A near the outlet 7 The spring resiliently urges the valve disk 2 away from the valve seat 3 in order to allow the free flow of water between the inlet 6 and outlet 7 under normal conditions.

Should the temperature of the water entering the housing 5 exceed a preselected maximum, e.g., 113° F., the expandable element 1 will have expanded sufficiently so as to cause the valve disk 2 to enter into the opening within seat 3. A small radio clearance is defined between the valve disk 2 and seat 3 to allow the hot water to slowly leak therethrough. Such water will cool quickly, and the valve can be reopened at once upon the water temperature returning to acceptable levels In addition, the residual flow of water indicates to the user that the fixture is not shut off and that there is simply a water temperature problem in the supply line. The temperature at which the valve "closes" can be adjusted by means of the set screw 4 to move the valve disk 2 towards or away from the valve seat 3. If moved closer to the valve seat 3, the water supply will be cut off at a lower temperature as the expandable element 1 will not need to expand to as great an extent in order to move the valve disk 2 within the opening in valve seat 3.

The valve disk 2 may be provided with a rubber sleeve (not shown) to form a seal against the valve seat 3. The elasticity of the rubber should be sufficient to allow movement of the valve disk upon the expansion of the expandable element. A hole may be provided in the valve disk for allowing a residual flow of water when the valve disk is in the closed position.

Figure 2:
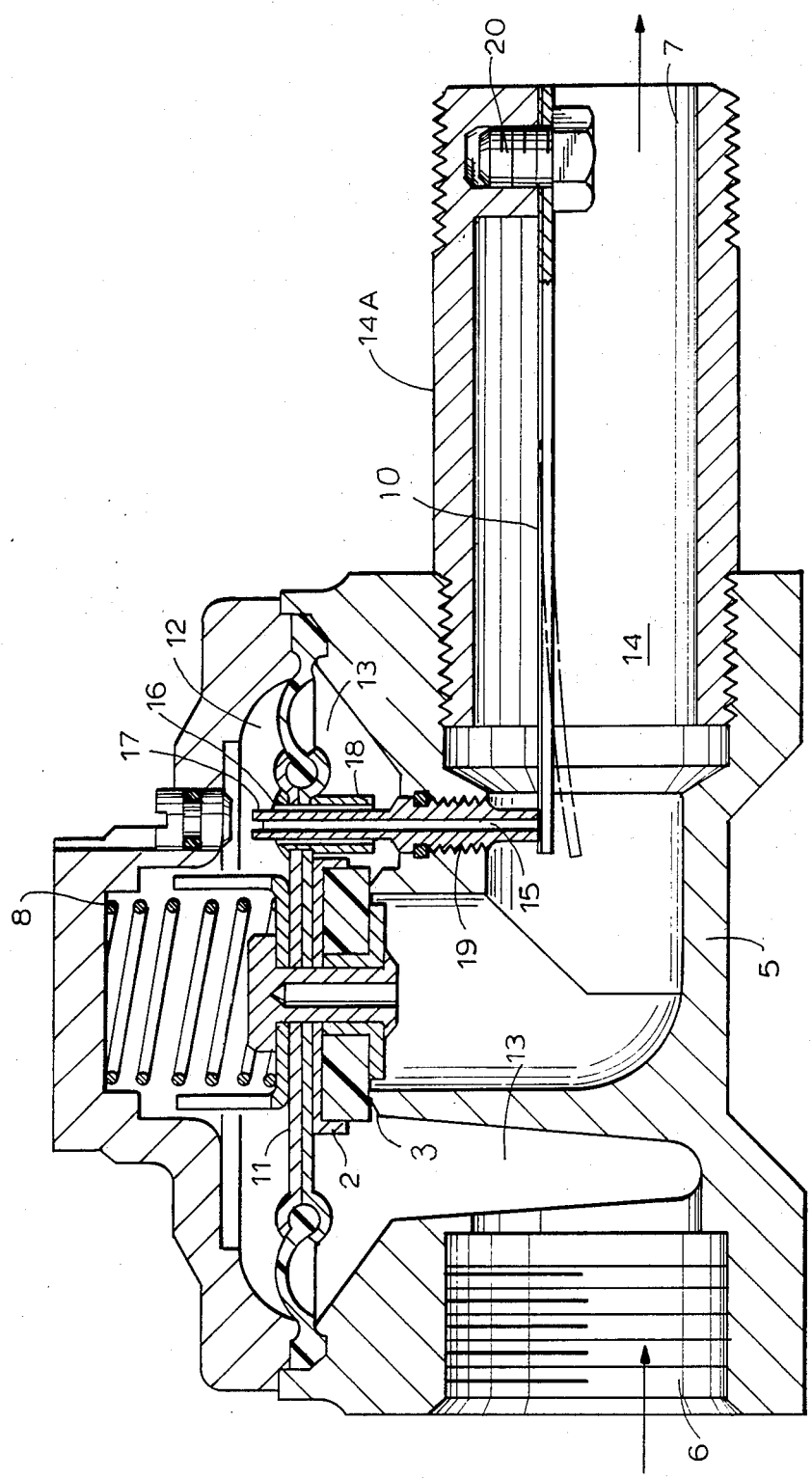
FIG. 2 is a sectional view of a second embodiment of the invention including a diaphragm valve.

FIG. 2 illustrates a second embodiment of the invention. As in the first embodiment, a housing 5 is provided which includes an inlet 6 and an outlet 7. The housing walls define an entrance chamber 13 and a control chamber 12 which are separated by a diaphragm 11. A cylindrical member defining a portion of an exit chamber 14 and the outlet 7 is mounted to the housing. The valve member itself comprises a disk 2 and a valve seat 3 which operate in a well known manner. A tube 17 having an outflow bore 15 establishes fluid communication between the exit chamber 14 and the control chamber 12. A sleeve 18 is positioned about the tube 17 along the portion in which it extends through the diaphragm 11. The sleeve has a greater diameter than the outside diameter of the tube 17, and terminates in the entrance chamber 13. The entrance chamber is accordingly in fluid communication with the control chamber 12. Water flows outside of tube 17 from the entrance chamber 13, through the annular space 16 within sleeve 18, into the control chamber 12, and through an outflow bore 15 into the exit chamber 14. When the valve is open, water can also flow past the valve disk 2 and seat 3 into the exit chamber 14.

A bimetallic strip 10 is mounted to one end of the cylinder 14A which defines the exit chamber 14 by a screw 20. If the water temperature within the exit chamber exceeds a preselected value, the strip moves to the position shown in solid lines in FIG. 2, thereby closing off the tube 17 and, as a result, closing the diaphragm valve 11. Since water can no longer drain out of the control chamber 12, the additional load on the diaphragm brings the valve disk 2 into closing contact with the valve seat 3. The temperature at which the valve is closed may be adjusted by displacement of the tube 17. The lower portion of the tube is accordingly threaded at 19 to allow such adjustment along its longitudinal axis with respect to housing 5.

Figure 3:
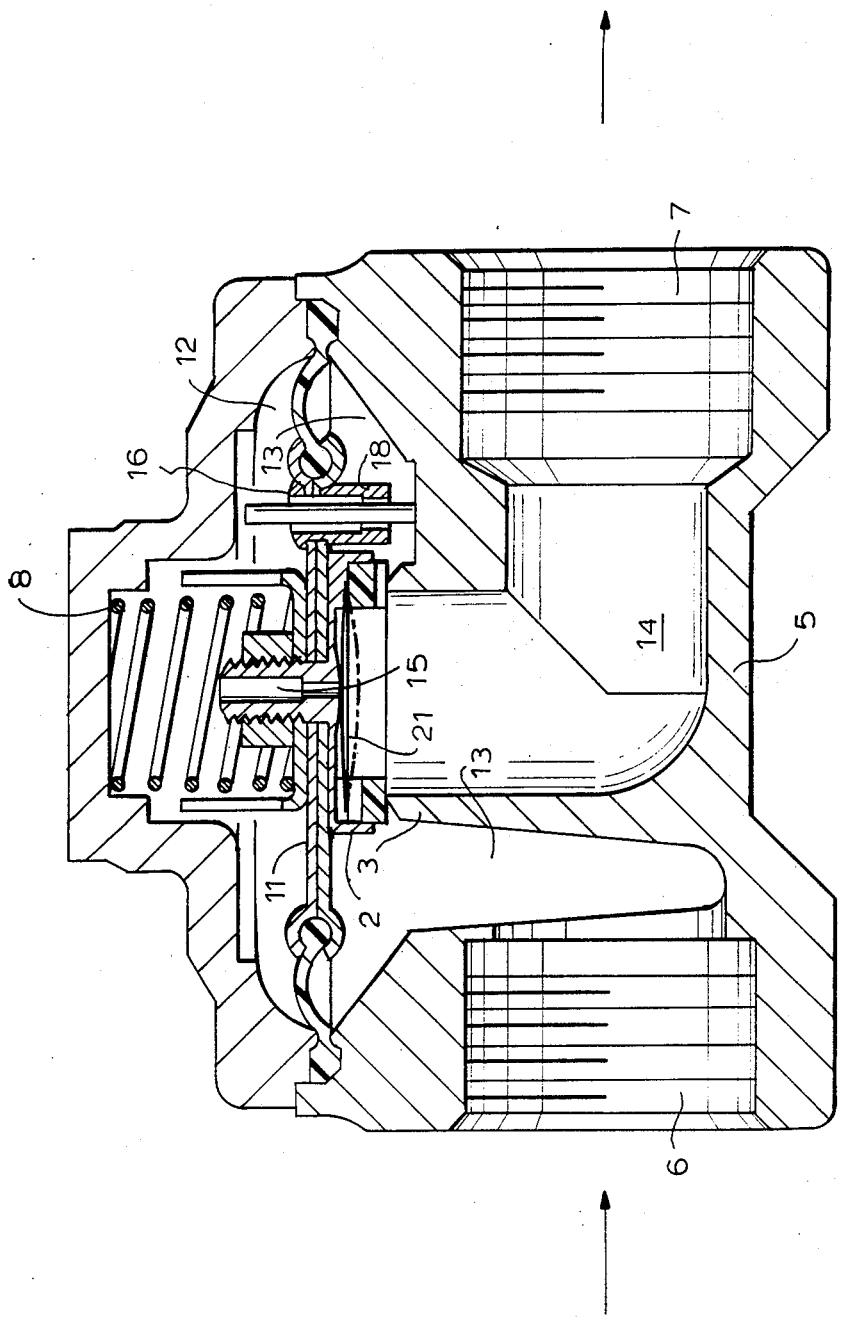
FIG. 3 is a sectional view of a third embodiment of the invention including a bimetallic spring disk.

FIG. 3 shows an embodiment of the invention similar to that shown in FIG. 2 Here again, water can enter through the entrance chamber 13 through the inflow bore 16 of sleeve 18 into the control chamber 12. In this case, however, the outflow bore 15 is located in the valve disk 2, through which the water can escape into the exit chamber 14. A bimetallic spring disk 21, otherwise known as a "click" disk, is mounted in opposing relation to the outflow bore 15. The disk is adjusted to a certain "pop" temperature, such that it will "pop" into a closed position at 45° C., for example, and "pop" back into the open position at, for example, 40° C. (104° F.). As discussed above, the pre-cambered disk 21 is directly opposed to the outflow bore 15, the latter being closed when the higher temperature is reached. The diaphragm valve will accordingly then close as well. To allow the limited flow of water, a notch (not shown) may be provided in the valve disk 2.

Figure 4:
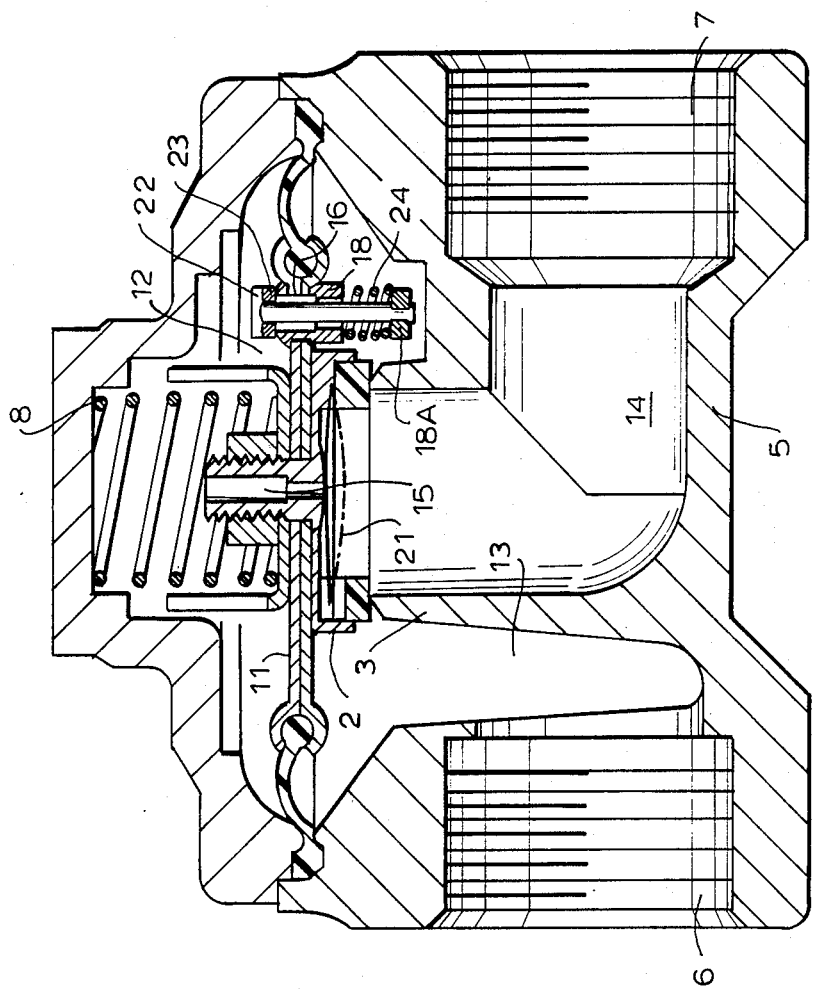
FIG. 4 is a sectional view of an assembly similar to that shown in FIG. 3, but also including a check valve.

FIG. 4 illustrates a modification of the structure shown in FIG. 3, a check valve 22 here being positioned in the inflow bore 16 and including a seal 23. A coil spring 24 is positioned between the sleeve 18 and an abutment 18A. In this embodiment, water can flow from the entrance chamber 13 into the control chamber 12, but not in the other direction. This embodiment is particularly advantageous in combination with the bimetallic spring disk 21. Since the disk, even after it pops, will not seal the outflow bore 15 of the control chamber 12 completely, opening of the main valve in reverse flow is precluded because water can seep into the control chamber 12.

Figure 5:
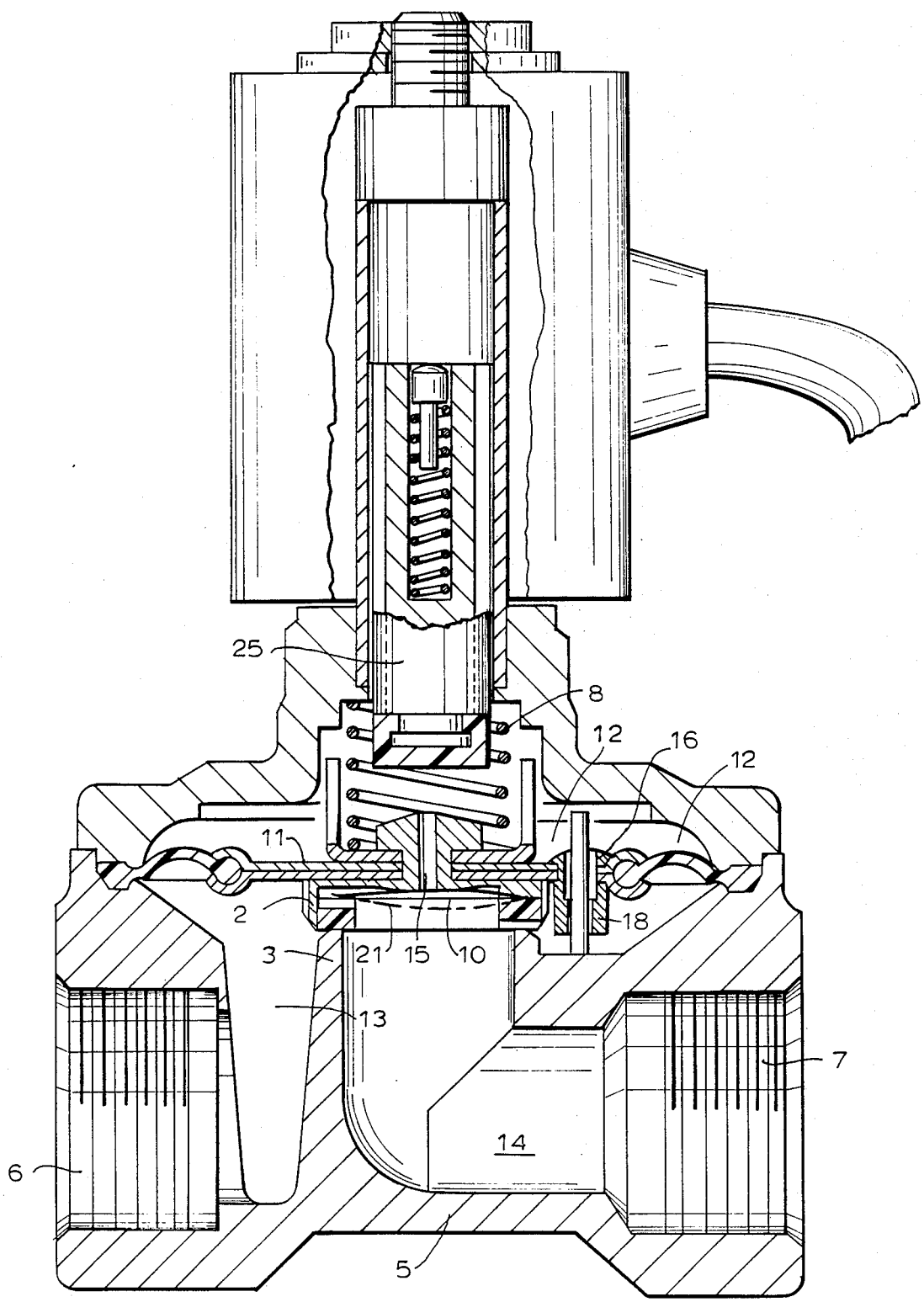
FIG. 5 is a sectional view of an assembly similar to those shown in FIGS. 3 and 4, and including a magnetic valve which is used in conjunction with a bimetallic spring disk.

FIG. 5 illustrates an embodiment of the invention similar to those shown in FIGS. 3 and 4, except that a magnetic valve 25 is used in combination with the bimetallic spring disk 21. Most fixtures having contactless optical and/or electronic control open by means of a magnetic valve. Protection against scalding can therefore be obtained economically by installing a bimetallic spring disk 21. FIG. 5 shows the fixture in a position in which, according to the position of the magnet, the valve would be open, but it is instead kept closed by the release or pop of the bimetallic disk 21. The magnetic valve is not shown in detail as practically any type of magnetic valve may be employed herein. A slight residual flow of water can be provided when the valve is closed by providing a slit in the underside of the disk.

What is claimed is:

1. An assembly for preventing water exceeding a preselected temperature from exiting a supply line, comprising:
   a supply line including a housing, said housing defining a chamber therein;
   an inlet connected to said housing and in fluid communication with said chamber;
   an outlet connected to said housing and in fluid communication with said chamber;
   a deformable, temperature-sensitive element mounted to said housing;
   a valve assembly including a diaphragm positioned within said chamber, a valve member secured to said diaphragm, and a valve seat defined by said housing, an entrance chamber defined by said housing and a first side of said diaphragm, said entrance chamber being in fluid communication with said inlet, a control chamber defined by said housing and a second side of said diaphragm, an exit chamber defined by said housing and said valve assembly, said exit chamber being in fluid communication with said outlet, said valve assembly separating said entrance chamber from said exit chamber and controlling fluid communication between said entrance and exit chambers, a first passage for establishing fluid communication between said entrance chamber and said control chamber, a second passage for establishing communication between said control chamber and said exit chamber, means responsive to the deformation of said temperature sensitive element for closing said second passage, said diaphragm urging said valve member towards said valve seat when said second passage is closed;
   a tube extending through said diaphragm;
   a sleeve positioned about said tube; and
   a space defined between said tube and said sleeve, said first passage being defined by said space between said sleeve and said tube, said second passage defined by said tube.

2. An assembly as defined in claim 1 wherein said means for closing said second passage is a bimetallic strip.

* * * * *